Dec. 27, 1966 H. C. SIBLEY 3,294,969
HOT WHEEL DETECTOR APPARATUS FOR RAILWAY VEHICLES
Filed Aug. 14, 1964 2 Sheets-Sheet 1
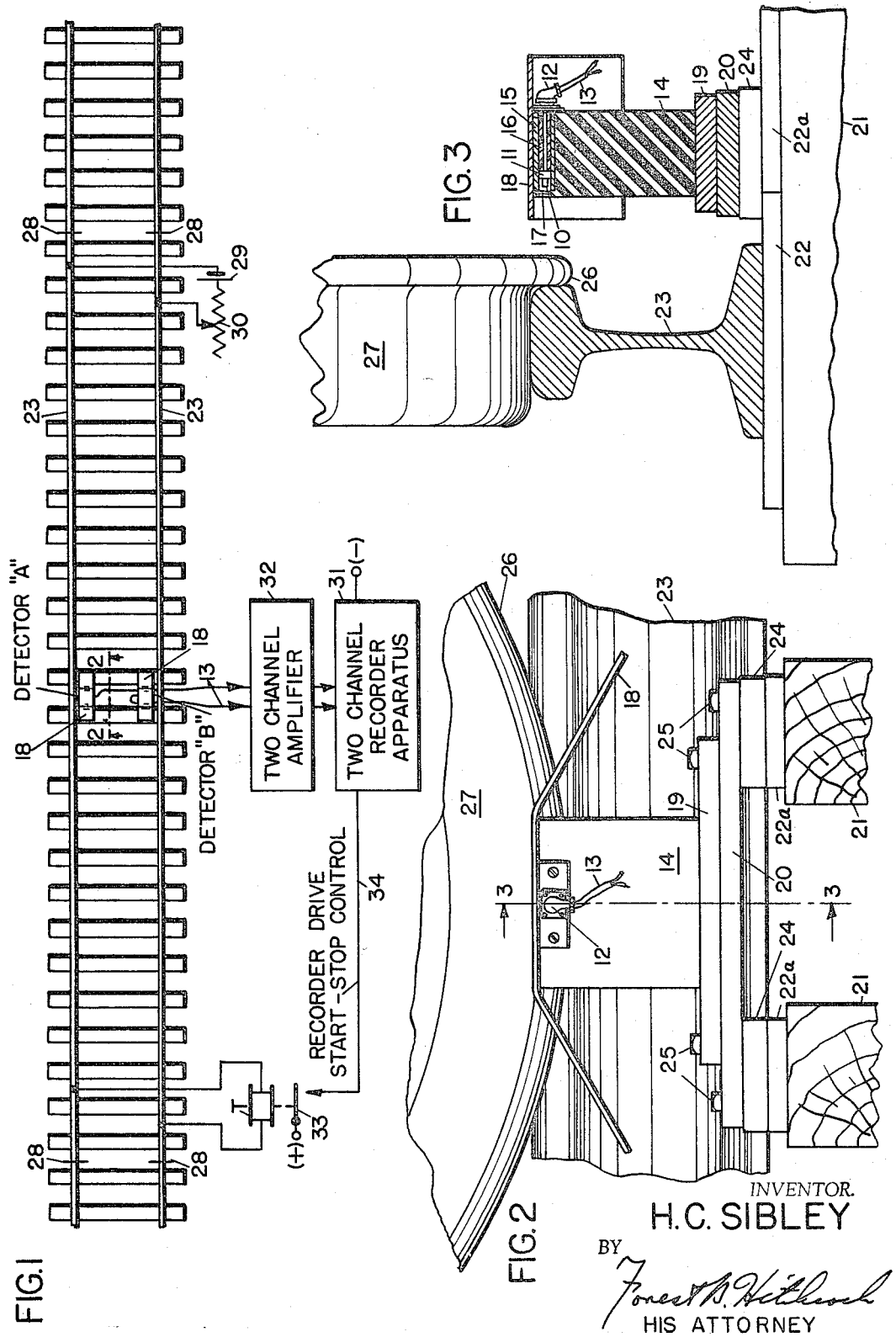
INVENTOR.
H.C. SIBLEY
BY
HIS ATTORNEY Dec. 27, 1966     H. C. SIBLEY     3,294,969
HOT WHEEL DETECTOR APPARATUS FOR RAILWAY VEHICLES
Filed Aug. 14, 1964     2 Sheets-Sheet 2
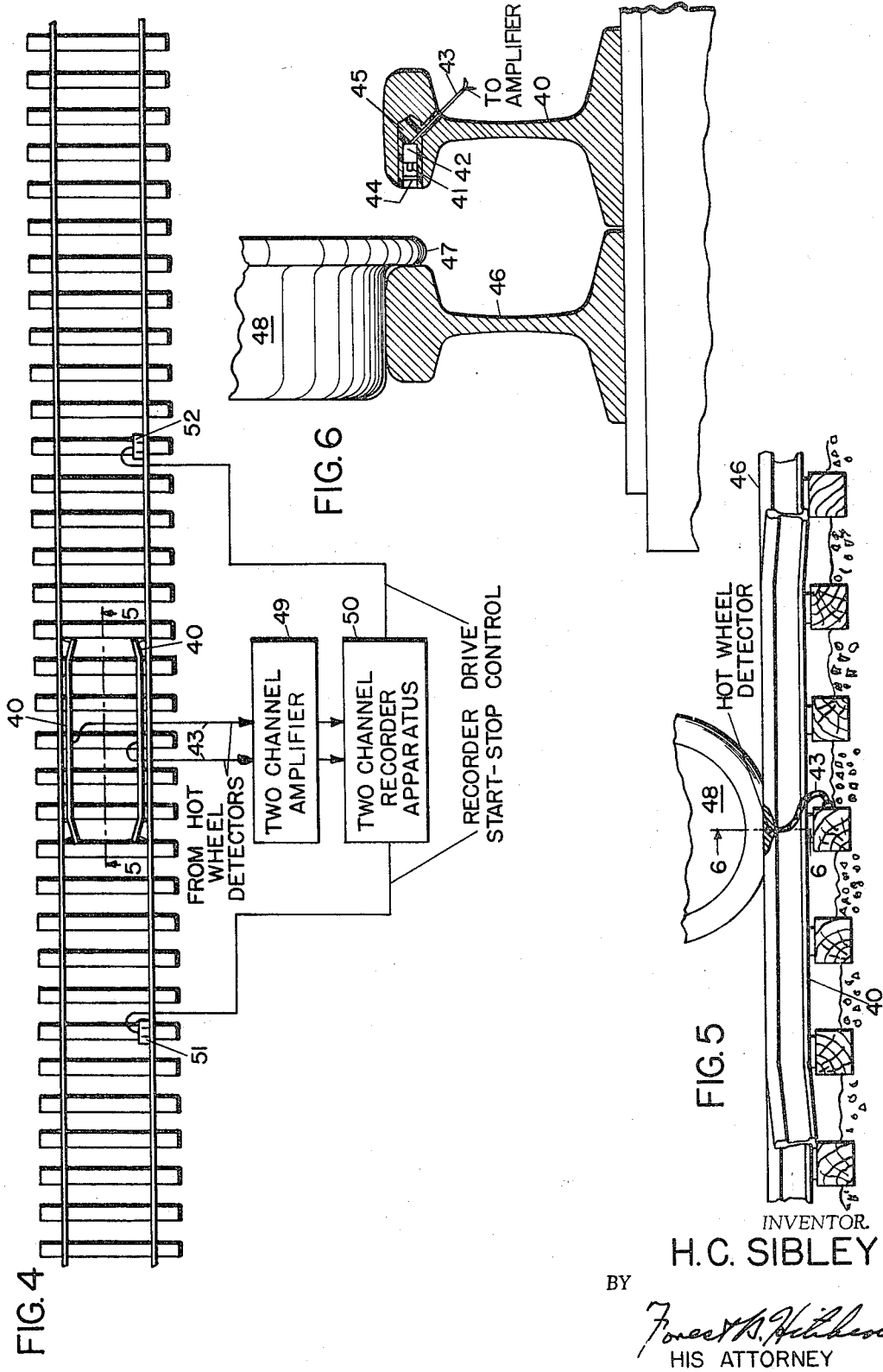
INVENTOR.
H.C. SIBLEY
BY
HIS ATTORNEY

United States Patent Office 3,294,969
Patented Dec. 27, 1966

3,294,969
HOT WHEEL DETECTOR APPARATUS FOR RAILWAY VEHICLES
Henry C. Sibley, Spencerport, N.Y., assignor to General Signal Corporation, Rochester, N.Y., a corporation of New York
Filed Aug. 14, 1964, Ser. No. 389,604
6 Claims. (Cl. 246—169)

Generally speaking, the present invention relates to detector apparatus and more particularly pertains to apparatus for detecting hot wheels on railway vehicles.

During railway operations, it is desirable to detect the presence of overheated wheels which might be caused, for example, by dragging brakes or the like, and which if not detected early enough may readily result in undesirable wearing of wheels to produce flat spots thereon, and, in extreme cases, derailment of the vehicle can result.

In view of the above considerations, the present invention provides a hot wheel detecting organization wherein the heat sensing of detecting unit, for example of the well-known infrared radiation detector type, is so mounted on the wayside as to be relatively unsusceptible to extraneous heat sources, and, thus does not require the gating or shutter control apparatus found to be necessary in many of the detection systems heretofore proposed, for example, to detect hot boxes on such railway vehicles.

More particularly, it is proposed in accordance with the present invention that the detecting unit(s) is mounted in position slightly inboard of the running rail on which the wheels ride, at a height substantially aligned horizontally with the running rail head so that the detecting unit is detected towards; i.e. is continually "looking at," the innerside of the rail head and therefore also at the flanges of all passing wheels. Since the detector unit is disposed in substantially horizontal alignment with the running rail head, it thus will be directed or "looking at" the running rail when no wheels are present, whereby the unit is relatively insensitive to infrared radiation from extraneous sources such as the sun, etc.

Obviously, however, since the detector is mounted inboard of the running rails to view the flanges of passing wheels, the detector unit mounting must be such as to protect the detecting unit from injury that might otherwise be caused by equipment hanging down from the vehicles passing thereover. Accordingly, the present invention proposes two different manners of protectively mounting the sensing or detecting units on the wayside; the first utilizing a guard rail disposed between the running rails in the usual manner, with the detecting unit mounted within a suitable cavity therein; whereas, the second protective mounting employs a resilient mounting block assembly to which the infrared sensing unit is attached and which mounting block is purposely selected to have a predetermined amount of resiliency whereby any hanging equipment on a railway car passing thereover will not injure the sensing unit but will merely deform the mounting block in passing.

Although the foregoing discussion has been particularly concerned with hot wheel detecting apparatus for use on railroads, it should be understood at this time that the protective mounting arrangement provided by the present invention could equally as well be employed for mounting other types of devices on the wayside closely adjacent a vehicle right of way where they may communicate with the vehicles in passing and whereby the wayside devices are protected from injury that might otherwise result from impacting with equipment hanging from the passing vehicles.

In view of the above, one object of the present invention is to provide simple, yet effective means for detecting the presence of hot wheels on a railway vehicle.

A further object of this invention is to provide hot wheel detecting apparatus mounted on the wayside to view the flange of each passing wheel.

Another object of this invention is to provide for protectively mounting the hot wheel detecting apparatus or the like on the wayside so that it will not be injured by impact with equipment hanging from a vehicle passing thereby.

Other objects, purposes and characteristic features of the present invention will in part be pointed out as the description of the invention progresses, and, in part be obvious from the accompanying drawings, in which:

FIG. 1 is a diagrammatic illustration of a typical track layout equipped with hot wheel detecting apparatus in accordance with one embodiment of the present invention;

FIG. 2 is an enlarged sectional view taken along line 2—2 in FIG. 1 when viewed in the direction of the arrows and illustrating a railway car wheel as it passes the hot wheel detector apparatus constructed in accordance with this one embodiment of the present invention;

FIG. 3 is a sectional side view of the hot wheel detector unit of FIG. 2 taken along line 3—3 and viewed in the direction of the arrows;

FIG. 4 is a diagrammatic illustration of a track layout equipped with hot wheel detector apparatus in accordance with a second embodiment of the present invention;

FIG. 5 is a sectional view of the trackway taken along line 5—5 in FIG. 4 and viewed in the direction of the arrows illustrating guard rail mounting of the hot wheel detecting unit; and FIG. 6 is an enlarged sectional view taken along line 6—6 in FIG. 5 when viewed in the direction of the arrows and showing in more detail how the hot wheel detector unit is mounted in the guard rail in position to view the flange of railway car wheels passing thereby.

As mentioned above, two different embodiments of the present invention are shown and will be described hereinafter. A first of these embodiments is illustrated in FIGS. 1 through 3 wherein the hot wheel detector unit (e.g. infrared detector) is mounted in proper position at the detecting location by means of a resilient mounting structure constructed, in part, of rubber or the like. More specifically, the heat detecting unit provided in accordance with the first embodiment of the present invention comprises an infrared sensitive element (for example, of the well-known lead selenide type), designated at 10 in FIG. 3, which is carried on a suitable mounting head 11 and is electrically connected, via plug coupling 12 and cable 13, to suitable wayside recording apparatus to be described hereinafter. This heat detecting unit 10–11 is resiliently mounted on the wayside in a suitable resilient mounting block 14 made of rubber or the like and which has a suitable metal plate insert 15 disposed and bonded in a recess at the top thereof. More particularly, the detecting unit 10–11 is inserted into a hole drilled through the plate 15 and block 14 and which is subsequently filled with a suitable epoxy resin or the like, designated at 16 in FIG. 3, to insulatedly seal the detector unit within the mounting block 14. Disposed just in front of (to the left of, in FIG. 3) the heat detecting element 10 is a suitable infrared filter 17 whose purpose is to shield the element 10 and permit only that infrared radiation emitted by wheel flanges to impinge upon it.

Attached (for example, by flat-head screws or the like) to the top of the plate 15 is deflecting plate 18 having a general shape most clearly shown in FIG. 2, and including a horizontal center portion and two downwardly sloping end portions.

A second metallic plate 19 is suitably bonded to a bottom surface of the resilient mounting block 14 and is disposed atop a suitable mounting plate 20 which, in turn, extends between railway ties 21 and which is supported atop the tie plates 22 and suitable tie plate extensions 22a (see FIG. 3), at a suitable height relative to the running rail 23 by the use of shimming plate 24 of proper thickness. The bolts 25 serve to anchor the complete detecting structure in proper wayside position. It should be understood at this time that the extension plates 22a (in FIG. 3) may be omitted if the tie plates 22 are of sufficient dimension to accommodate both the running rail and the detector mounting assembly, as is assumed to be the case in the embodiment of FIGS. 4 through 6.

As is clearly illustrated in the drawings FIGS. 1 through FIG. 3, the detecting apparatus is mounted inboard of the running rails 23 with the heat detecting unit 10–11 disposed at substantially the same height as the head of the running rail 23 so that it views the flange 26 of a railway wheel 27 passing adjacent thereto, and, is responsive to infrared energy radiated by the wheel flange 28 whenever it becomes hot due to dragging brakes or the like.

FIG. 1 of the accompanying drawings more particularly illustrated how two hot wheel detecting units, of the type shown in detail in FIGS. 2 and 3 and designated detectors "A" and "B," would be mounted to investigate both sides of each railway car passing over the illustrated stretch of track shown in FIG. 1. More particularly, this illustrated layout includes a track section defined by the insulated joints 28 and including a conventional track circuit effective to detect when a railway car is adjacent the hot wheel detection apparatus. This track circuit includes a suitable battery 29 and series circuit limiting resistor 30 connected across the rails 23 at the right-hand end of the illustrated track section, and, a conventional track relay T connected across the left-hand end. As will be described in more detail hereinafter, the track relay T provides start-stop drive control of a suitable two-channel recorder, of any well-known construction, generally designated at 31 in the accompanying drawings, in such a manner that the recorder drive motor (not shown) is turned on only when a railway car occupies the illustrated track section (track relay T dropped away) and which drive motor is turned off when the track section is unoccupied (track relay T picked up, as shown). Obviously, if the possibility exists that a train being monitored might stop on the track circuit, means could readily be provided for interrupting the recorder drive motor so as to avoid unnecessary travel of the recording paper, tape etc. under such conditions.

A suitable two-channel amplifier 32 feeds into the recorder 31 and includes a separate amplifying channel connected, via cable 13, to receive the output signals from each of the hot wheel detecting units "A" and "B" respectively. Without in any manner attempting to limit the spirit or scope of this invention, one form that the amplifier apparatus 32 may take is disclosed in the copending application of H. C. Sibley, R. B. Haner and J. A. Snell, Serial No. 186,597 filed April 4, 1962, now Patent No. 3,253,140 and having a common assignee with the present application. Obviously, if only one side of a railway vehicle needs to be scanned for hot wheels, only one detection unit is needed, and, the two-channel amplifier and recorder could then be replaced with single channel equipment.

The detecting system illustrated in FIG. 1 operates as follows: As long as a railway vehicle is not occupying the illustrated track section, the track relay T is picked up in the usual manner by current produced by the battery 29 and opens its back contact 33 to thereby deenergize the control wire 34 which is assumed here to lead to and control energization of the recorder drive motor mechanism (not shown) in such a manner that the recorder 31 remains unoperated until a railway vehicle enters upon the illustrated track circuit, at which time track relay T drops away to close its contact 33, and, the control wire 34 is now energized and activates the recorder drive motor to start the recording tape, paper, or whatever type of recording medium is employed, into motion.

Subsequently, as each overheated wheel passes the detection point, the radiant infrared energy received therefrom by the heat sensitive element 10 contained in the viewing hot wheel detecting unit (either detector "A" or "B" dependent upon which side of the car the overheated wheel is on) will be increased above the value received from a normal or unheated wheel, and, a distinctive electrical signal pulse will result on one of the output cables 13 for input to the associated channel on the amplifier 32 and recorder 31. In this manner, a permanent record is obtained concerning the presence of each hot wheel on a passing train, and, by employing the track circuit for starting and stopping the recorder drive mechanism, as the vehicle passes the detection point, the approximate location of each hot wheel in the train can more readily be ascertained from the recording tape, paper, etc.

As pointed out above, a certain value of infrared energy would normally be received at the detecting element 10 from an assumed normal wheel, due to normal running and normal brake applications. This causes the detection unit to generate an output pulse of relatively low amplitude (compared to that of the pulse produced as a result of an abnormally hot wheel) for each passing wheel, and, this information could obviously be utilized to distinguish from the hot wheels, as well as from any passing wheel on which the brakes are inoperable; i.e. if the brakes on a particular car have not been applying properly, the associated wheel or wheels will be relatively cold and thus will be indicated by an abnormally low amplitude pulse (or no pulse) at the output of the detection apparatus.

With particular reference to FIGS. 2 and 3, since the detecting unit is in substantial horizontal alignment with and therefore "looking at" the rail head when no wheels are present, a relatively low, constant value, of any of background radiation will be received by the heat sensitive element, and, the detecting unit is thereby substantially insensitive to extraneous infrared source such as the sun, etc. As mentioned previously, the detector unit positioning disclosed in accordance with this invention thus tends to obviate the need of gating or shutter control for the detecting apparatus, as was heretofore found necessary when using infrared sensitive elements for overheated wheel detection on railroad cars because the infrared sensor might otherwise, at times, be directed towards an extraneous source other than that portion of the wheel to be detected.

The embodiment shown in FIGS. 1 through 3 is particularly adaptable for dragging brake detection in a rapid transit application wherein the wayside apparatus must be mounted with very stringent space requirements; i.e. the detecting unit(s) can be mounted inboard of the running rails since they are protectively mounted so that any equipment hanging from the underside of vehicles passing thereover will not injure the detecting apparatus. More specifically, the mounting block 14 is purposely made of resilient material, such as rubber or the like, so that it (the mounting block) will "give" when subjected to the forces caused by impact with any hanging equipment and thereby become momentarily deformed so as to permit such hanging equipment to pass over without damage to the heat sensing unit 10–11 (see FIG. 3).

The deflecting plate 18 also serves to prevent possible damage to the heat detecting unit 10–11 from hanging equipment, in that its downwardly sloping edges are aligned to face vehicle traffic (see FIG. 2) and thus prevent such equipment from banging into the side of the detecting apparatus; i.e. they serve to cause the equipment to ride up over the detecting unit thereby decreasing the possibility of completely dislodging the detecting apparatus from its wayside mounting.

Moreover, it will be noted in FIG. 3 of the drawings that the deflecting plate 18 is of substantially greater width (from left to right in FIG. 3) than the resilient mounting block 14 so that such plate 18 further serves to help shield the detecting unit from the sun, rain, snow, etc. and also from any foreign matter that might happen to fall thereupon, for example, from underneath a passing railway train.

The second embodiment of the present invention shown in FIG. 4 through FIG. 6 assumes the use of short length guard rail 40 for protectively mounting hot wheel detecting units on either side of the roadbed. More specifically, and with reference particularly to FIG. 6 of the drawings, the detector apparatus in accordance with the second embodiment of the present invention includes a heat sensitive element 41 carried on a suitable mounting head 42 disposed with a drilled out cavity in the guard rail 40, with the output cable 43 extending to the right in FIG. 6 and leading to the wayside amplifying and recording apparatus (see FIG. 4). Here again, it is assumed that the sensing element 41 is of the infrared detector type, and, a suitable filter 44 is disposed in front of the element 41 so that it is only responsive to the spectral range of infrared energy normally associated with the wheels to be investigated. In this embodiment of the present invention, the detecting apparatus is likewise insulatedly sealed in the guard rail 40 by the use of suitable epoxy resin or the like designated at 45.

As in the embodiment shown in FIGS. 1 through 3, the detecting unit 41–42 of FIG. 6 is mounted at substantially the same height as the head of the running rail 46 so that it views the flange 47 of each passing wheel 48, and, supplies electrical output signals to the suitable amplifier equipment 49 and recorder apparatus 50 to properly identify each overheated wheel passing the detecting location.

In the embodiment shown in FIGS. 4 through 6 of the accompanying drawings, the two-channel recorder apparatus 50 is again assumed to be controlled to have its drive apparatus (not shown) started and stopped in accordance with the sequential actuation of suitable vehicle detectors 51 and 52, disposed on either side of the detecting location, so that the recorder drive is turned on only while a vehicle is adjacent the hot wheel detecting apparatus. The vehicle detectors 51 and 52 may take any suitable form, such as, for example, treadles, photocells, ultrasonic detectors, etc.

In view of the above, it will thus be seen that two different embodiments of simple, yet effective apparatus for detecting hot wheels on railway vehicles have been provided by the present invention, with the first embodiment of FIGS. 1 through 4 employing resiliently mounted detecting unit apparatus; whereas, the second embodiment shown in FIGS. 4 through 6 discloses how the detecting apparatus is, as an alternative, protectively mounted in a guard rail disposed in the usual manner between the running rails of the right of way.

Having thus described hot wheel detecting apparatus, as specific embodiments of the present invention, it is desired to be understood that these forms have been selected to facilitate disclosure of the invention rather than to limit the number of forms which it may assume; and, it is to be further understood that various modifications, adaptations and alterations may be applied to the specific forms shown to meet the requirements of practice, without in any manner departing from the spirit or scope of the present invention.

What I claim is:

1. Apparatus for detecting the presence of overheated wheels on a railway vehicle adapted to travel on a pair of running rails comprising,
    (a) heat sensitive means responsive to the heat radiated thereto from an overheated wheel passing adjacent thereby,
    (b) mounting means positioned between said running rails for mounting said heat sensitive means in proper detecting position in substantial horizontal alignment with a head portion of one of said running rails, whereby said heat sensitive means is continually viewing the innerside of said rail head when no wheel is passing said detecting apparatus and whereby said heat sensitive means is particularly responsive to the heat radiated from the flange of a passing wheel, and
    (c) signaling means responsive to said heat sensitive means for giving an indication of the passage of each overheated wheel.

2. The detecting apparatus specfied in claim 1 wherein said mounting means includes a guard rail disposed between said running rails and having a cavity therein aligned horizontal with the rail head of one of said running rails to receive said heat sensitive means.

3. The detecting apparatus specified in claim 1 wherein said mounting means is partially constructed of resilient material to resiliently hold said heat sensitive means in said proper detecting position.

4. Detection apparatus for a railway vehicle adapted to travel on a pair of running rails comprising,
    (a) means responsive to heat radiated thereto from the wheels of a passing vehicle for producing an output signal indicative of the temperature of each of said passing wheels,
    (b) means positioned between said running rails for mounting said heat responsive means in proper detecting position in substantial horizontal alignment with a head portion of one of said running rails, whereby said heat responsive means is continually viewing the innerside of said rail head when no wheel is passing said detecting apparatus and whereby said heat responsive means is particularly responsive to the heat radiated from the flange of a passing wheel, and
    (c) means responsive to said output signal for distinctively registering the passage at said detection point of each wheel having an abnormal temperature.

5. The combination specified in claim 1 wherein said device is adapted to be mounted on the wayside in a position such that the vehicles pass thereover, and wherein said mounting means is formed of a resilient mounting structure comprising,
    (a) a resilient mounting block anchored at one end to the wayside and having its opposite end extending upwardly from the wayside, said block having a cavity therein adjacent its opposite end to receive and hold said heat sensitive device in a detecting position, and
    (b) a deflecting plate attached atop the opposite extending end of said block and having a downwardly sloping portion extending beyond said block in a direction facing the vehicle traffic.

6. The mounting structure specified in claim 5 wherein said deflecting plate has a substantially greater width than said mounting block.

References Cited by the Examiner

UNITED STATES PATENTS

| | | |
|---|---|---|
| 1,901,192 | 3/1933 | Reinhardt et al. |
| 1,901,208 | 3/1933 | Vayda. |
| 2,442,491 | 6/1948 | Gieskieng et al. __ 246—249 X |

FOREIGN PATENTS

| | | |
|---|---|---|
| 788,453 | 1/1958 | Great Britain. |
| 874,654 | 8/1961 | Great Britain. |
| 328,951 | 5/1958 | Switzerland. |

ARTHUR L. LA POINT, *Primary Examiner.*

S. T. KRAWCZEWICZ, *Assistant Examiner.*